Aug. 3, 1965 W. R. HORST ETAL 3,198,068

MICRO IMAGE STORAGE AND RETRIEVAL UNIT

Filed Feb. 8, 1963 11 Sheets-Sheet 1

INVENTOR
WILLIAM R. HORST
STANLEY F. COIL
BY Louis A. Kline
Richard G. Stahr
THEIR ATTORNEYS

MICRO IMAGE STORAGE AND RETRIEVAL UNIT

Filed Feb. 8, 1963 11 Sheets-Sheet 2

INVENTORS
WILLIAM R. HORST
STANLEY F. COIL
BY Louis A Kline
Richard G. Stahr
THEIR ATTORNEYS

MICRO IMAGE STORAGE AND RETRIEVAL UNIT

Filed Feb. 8, 1963 11 Sheets-Sheet 3

INVENTORS
WILLIAM R. HORST
STANLEY F. COIL
BY Louis A Kline
Richard G. Stahr
THEIR ATTORNEYS INVENTORS
WILLIAM R. HORST
STANLEY F. COIL
BY Louis A. Kline
Richard G. Stahr
THEIR ATTORNEYS INVENTORS
WILLIAM R. HORST
STANLEY F. COIL
BY Louis A. Kline
Richard G. Stahr
THEIR ATTORNEYS

MICRO IMAGE STORAGE AND RETRIEVAL UNIT

Filed Feb. 8, 1963 11 Sheets-Sheet 6

INVENTORS
WILLIAM R. HORST
STANLEY F. COIL
BY Louis A. Kline
Richard G. Stahr
THEIR ATTORNEYS

MICRO IMAGE STORAGE AND RETRIEVAL UNIT

Filed Feb. 8, 1963 11 Sheets-Sheet 7

INVENTORS
WILLIAM R. HORST
STANLEY F. COIL
BY Louis A. Kline
Richard G. Stahr
THEIR ATTORNEYS

MICRO IMAGE STORAGE AND RETRIEVAL UNIT

Filed Feb. 8, 1963 11 Sheets-Sheet 8

INVENTORS
WILLIAM R. HORST
STANLEY F. COIL
BY Louis A. Kline
Richard G. Stahr
THEIR ATTORNEYS INVENTORS
WILLIAM R. HORST
STANLEY F. COIL
BY Louis A Kline
Richard G. Stahr
THEIR ATTORNEYS INVENTORS
WILLIAM R. HORST
STANLEY F. COIL
BY Louis A. Kline
Richard G. Stahl
THEIR ATTORNEYS INVENTORS
WILLIAM R. HORST
STANLEY F. COIL
BY Louis A Kline
Richard G. Stahr
THEIR ATTORNEYS

United States Patent Office 3,198,068
Patented Aug. 3, 1965

3,198,068
MICRO IMAGE STORAGE AND RETRIEVAL UNIT
William R. Horst, Spring Valley, and Stanley F. Coil, Washington Courthouse, Ohio, assignors to The National Cash Register Company, Dayton, Ohio, a corporation of Maryland
Filed Feb. 8, 1963, Ser. No. 257,165
15 Claims. (Cl. 88—24)

The present invention relates to micro image storage and retrieval units and, more specifically, to units of this type having a circular record medium characterized by the ability to receive and retain a plurality of images in such a form that the retained images may be later retrieved by projection techniques.

To reduce the volume of storage required for records, scientific data, publications, or bit patterns as employed by modern digital computers, the practice of reducing the material to be stored to micro image size has become increasingly popular.

While micro image recording of documents to be filed has proved to be invaluable from the standpoint of conservation of storage space, it has been found to be something less than an ideal solution to the broad problem of storage and retrieval. A consideration which is just as important as that of filing or storage is the requirement of rapid accessibility of the material stored, whether the material be documentary records or bit patterns for computer input.

To retrieve the documentary records filed in this manner, it is necessary that the micro images be magnified to a size convenient for human, machine, or photographic utilization. Since the volume of materials and documents which are filed in this manner is increasing in magnitude, the requirement of a unit which facilitates rapid storage of and access to the stored material is apparent.

It is, therefore, an object of this invention provide an improved micro image storage and retrieval unit.

It is another object of this invention to provide an improved micro image storage and retrieval unit having a circular record medium which is characterized by the ability to receive and retain a plurality of images in such a form that the retained images may be later retrieved therefrom by projection techniques.

It is another object of this invention to provide an improved micro image storage and retrieval unit wherein a selected incremental area of the circular record medium may be accurately located at the focal point in the optical system without complex focusing mechanisms or precise locating linkages.

In accordance with this invention, a micro image storage and retrieval unit is provided wherein the record medium is of circular configuration and is characterized by the ability to receive and retain a plurality of images in such a form that the retained images may be later retrieved therefrom by projection techniques and is arranged in such manner that any selected incremental area of the record medium may be quickly and accurately indexed and brought into register with the optical system.

For a better understanding of the present invention, together with further objects, advantages, and features thereof, reference is made to the following description and to the accompanying drawings, in which.

Figure 1:
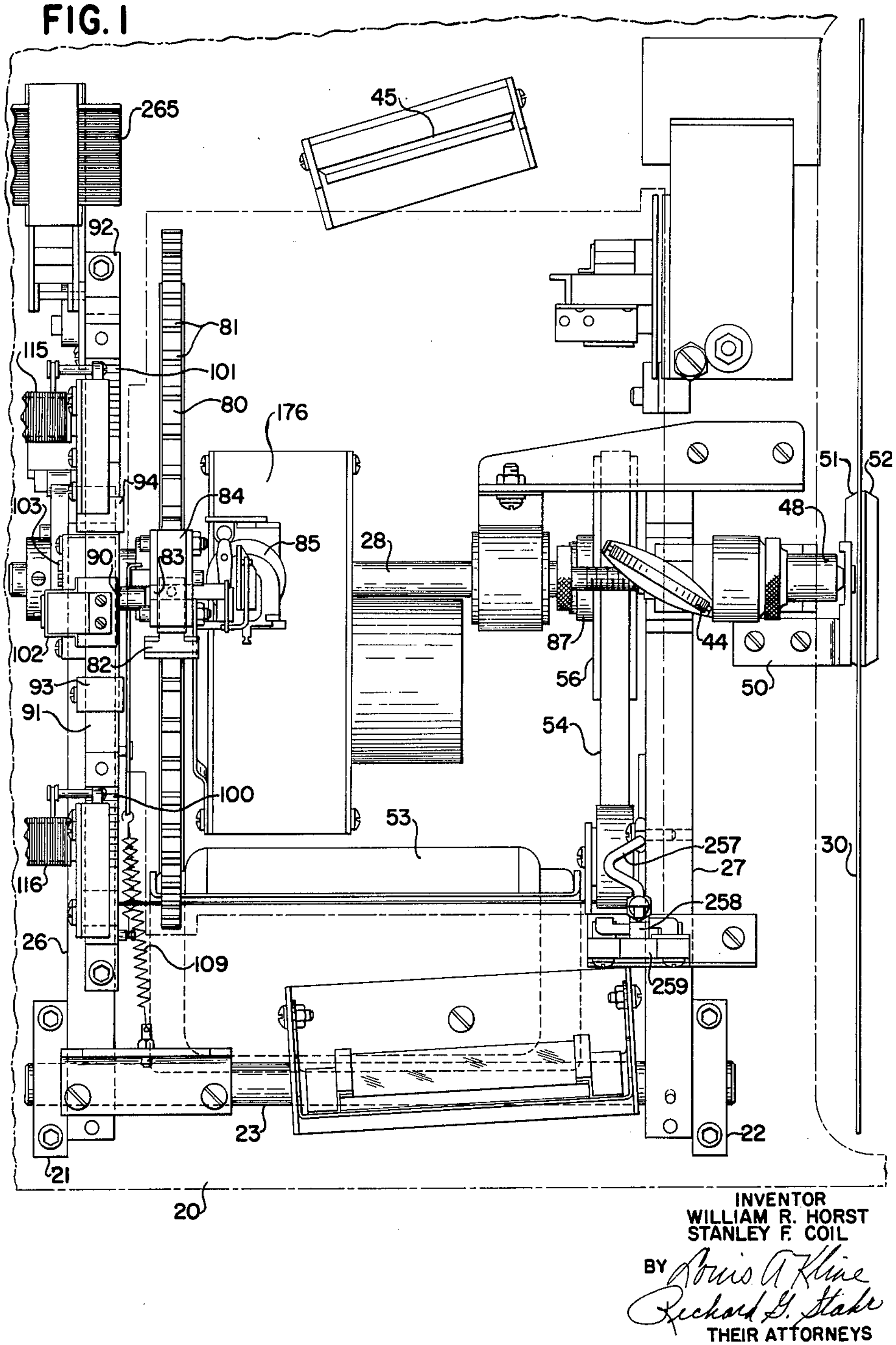
FIGURE 1 is a top view of the unit of this invention.
Figure 2:
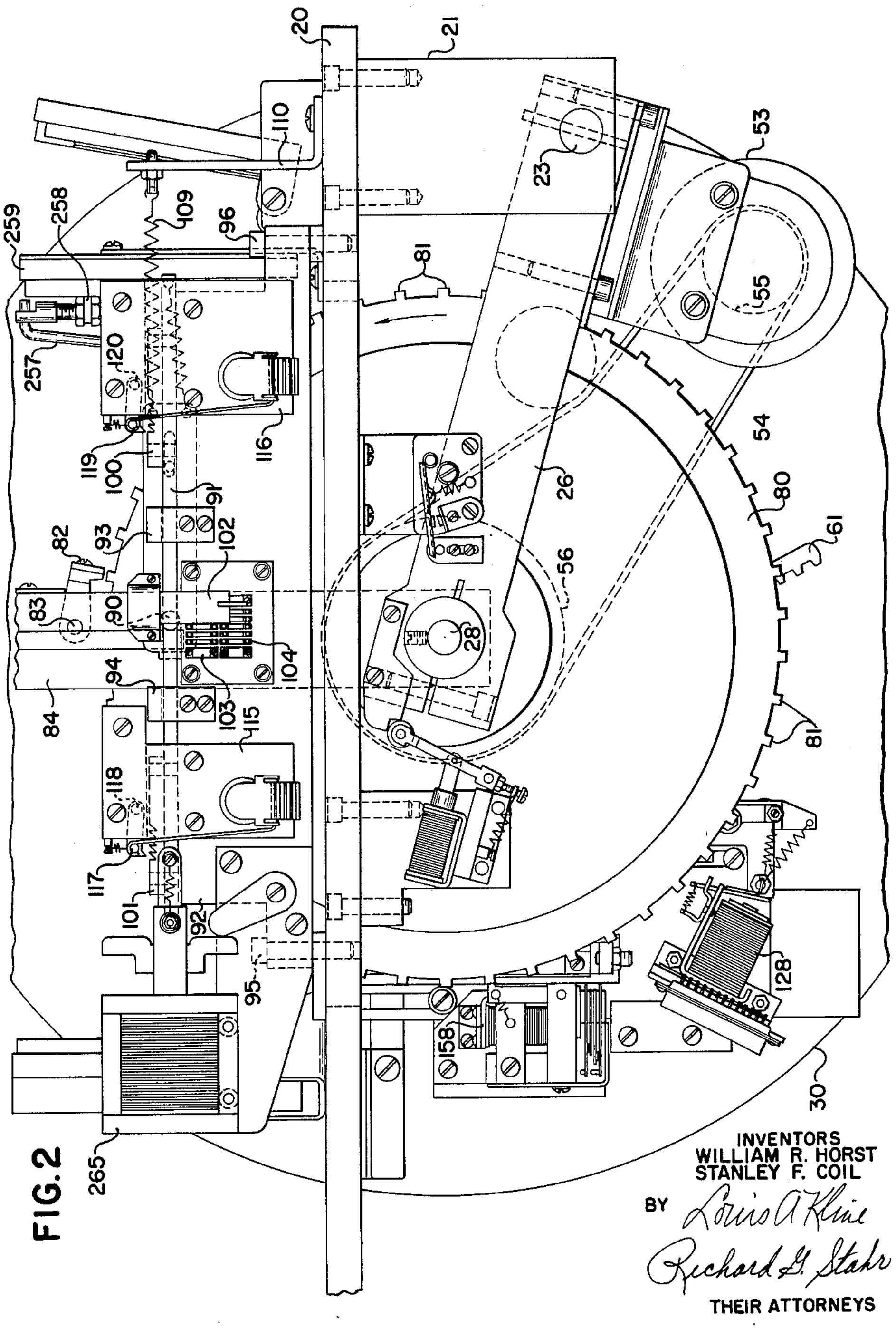
FIGURE 2 is a side view of the unit of this invention as it appears when looking at the left side of FIGURE 1.
Figure 3:
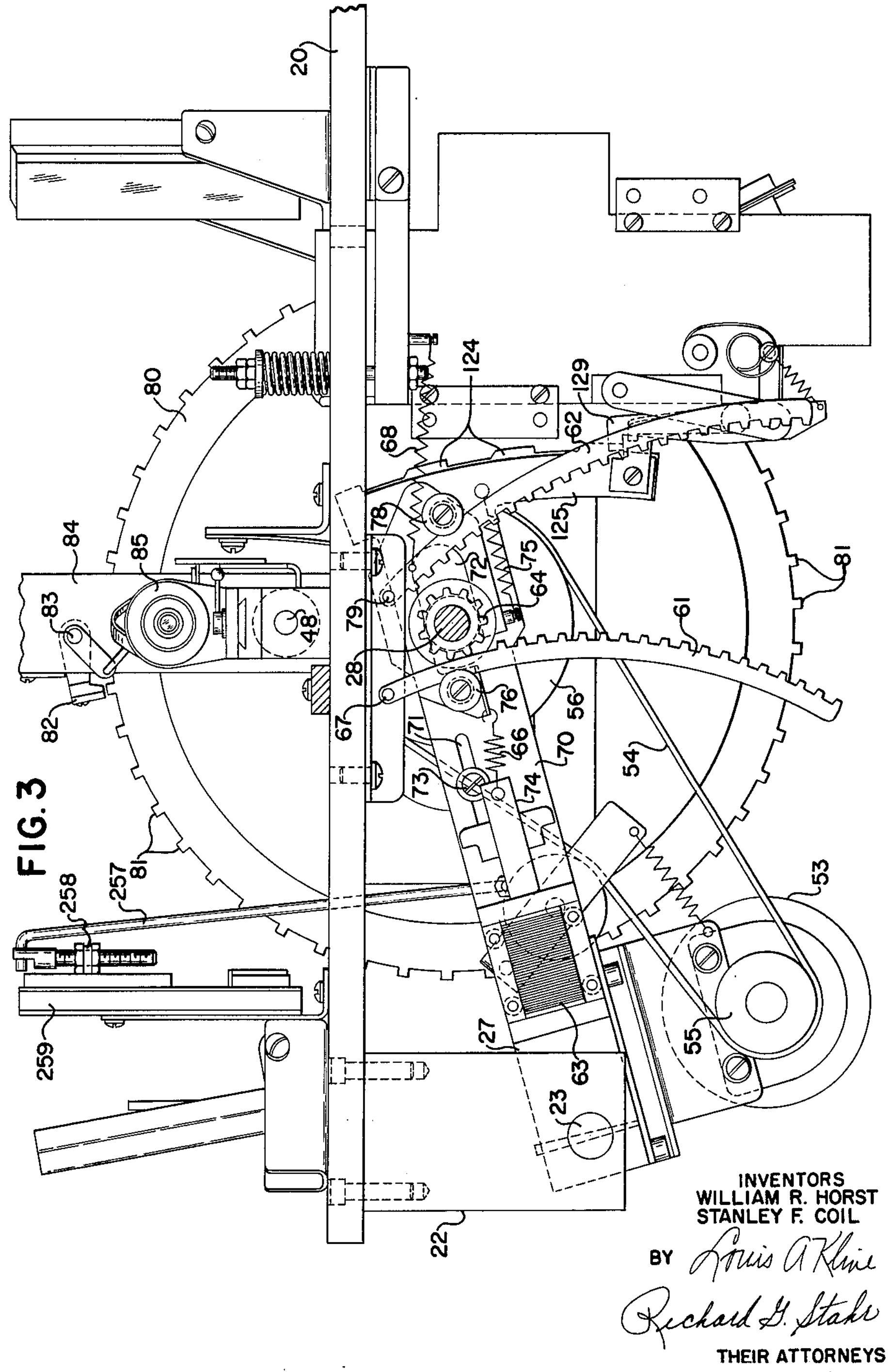
FIGURE 3 is a side view of the opposite side of the unit of this invention.

Referring to the drawings, in which like elements have been given like characters of reference in the several views, FIGURE 1 is a top plan view of the unit of this invention, while FIGURES 2 and 3 are views of respective opposite ends of the unit of this invention.

To rigidly support the various components of the unit of this invention, a base member indicated as a horizontal plate 20 is employed. Extending vertically below the base member 20 are two supporting members 21 and 22, having an axle member 23 extending therebetween. A pair of parallel arm members 26 and 27 are pivotally mounted upon respective ends of the axle member 23 and rotatably support a shaft member 28 between their opposite extremities. With this arrangement, the shaft member 28 is rotatably supported by a mechanical linkage arrangement comprising the arms 26 and 27, which are pivotally mounted upon a supporting unit comprising the supporting members 21 and 22 and the axle member 23, in such a manner that the shaft member 28 may be rotated about its axis and also displaced substantially radially about the axis of the supporting axle member 23 through the use of mechanisms which will be explained later.

Mounted upon a selected end of the shaft member 28 is the circular record medium 30. For purposes of drawing clarity, this circular record medium has not been shown in FIGURE 3. This circular record medium should be flexible and may be made up of any one of the several available clear plastic compounds. To receive images and retain them for retrieval at a future time, the surface of the record medium is coated with a selected commercially available photo-sensitive compound. The photo-sensitive compound used may be of the silver salt variety, such as that used with photographic film, or it may be of the variety of compounds known in the art as phototropic compounds. It may be pointed out that the phototropic compounds have the advantage of immediate visibility upon exposure without the development process required with the silver salt compounds. Furthermore, many of the phototropic compounds are light-erasible, a feature which may be very desirable in certain applications. The surface of the record medium thus coated is the recording surface area thereof. In this specification, reference will be made to the record medium, it being understood that the recording surface area is an integral portion thereof.

In a practical application, the record medium was made up of a circular disc of a clear, flexible plastic material such as that marketed under the trade name "Mylar" by E. I. du Pont de Nemours and Company, of approximately seventeen inches' diameter. A surface of the record medium disc was coated with a phototropic material which is sensitive to ultra-violet light for recording and may be erased by yellow light for removal or correction.

Figure 6:
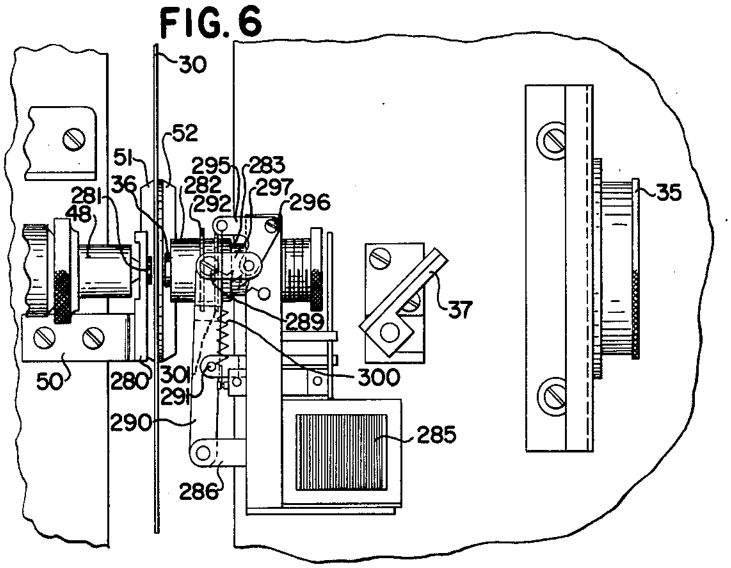
FIGURE 6 is an enlarged view of the focusing mechanism of the unit of this invention.
Figure 7:
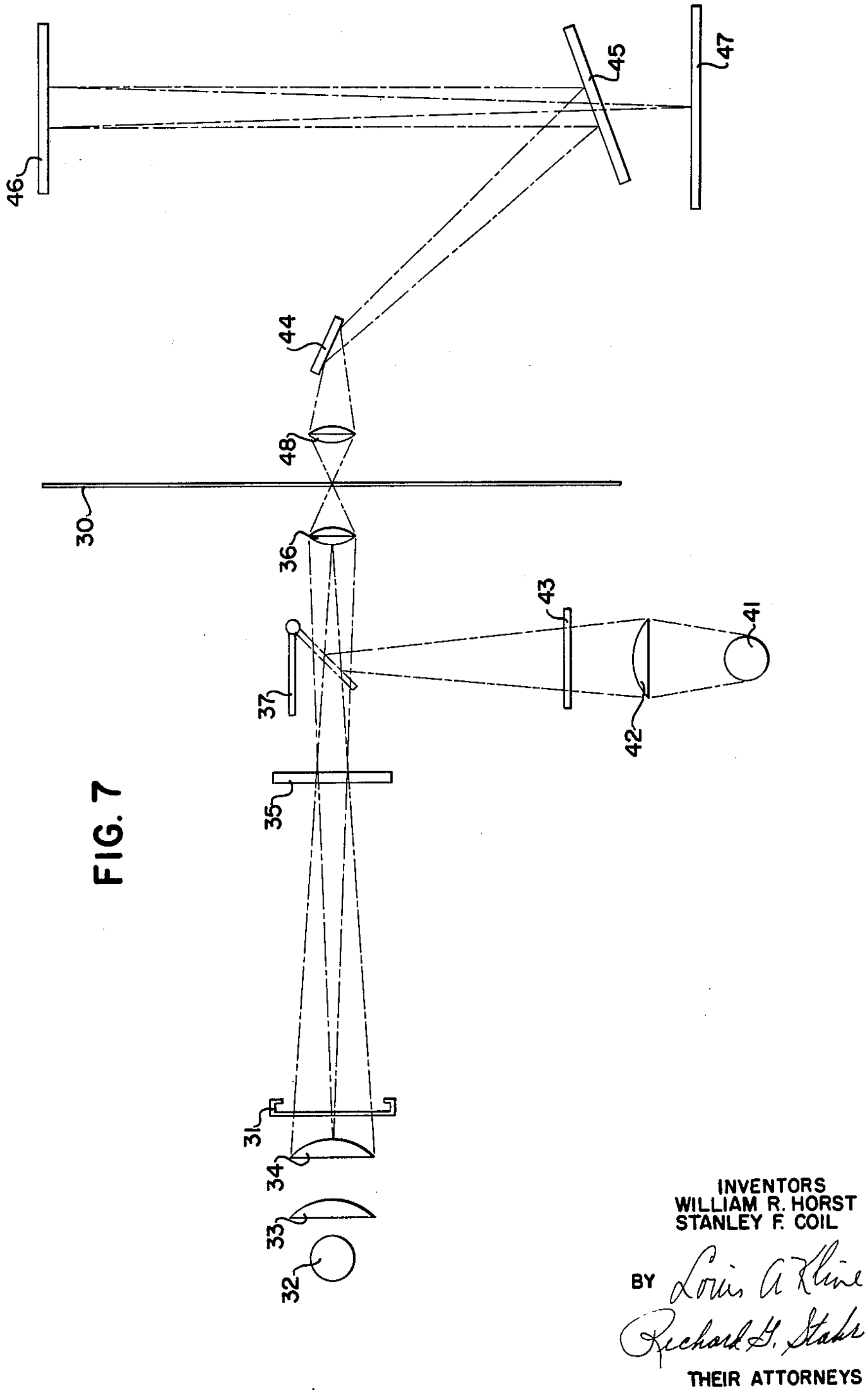
FIGURE 7 is a schematic diagram of the optical system of the unit of this invention.

As the images are normally recorded upon and are retrieved from the record medium by projection techniques, it is mandatory that a suitable system of optics be provided and, of course, that the record medium be mounted upon the end of the shaft 28, which will position the recording surface area thereof within the light path of the optical system. Since conventional optical systems may be employed, and since they form no part of the present invention, they have been schematically illustrated in FIGURE 7. Certain pertinent portions have also been indicated in FIGURES 1, 2, 3, and 6. Referring to FIGURE 7, a document to be recorded is inserted into a conventional holder 31. The light from a source 32 is directed through lenses 33 and 34 and a filter 35 and is focused upon another lens 36, which reduces the image and records it upon the record medium 30, which is positioned at the focal point of the lens 36. During the recording operation, a mirror 37 is swung out of position to permit the passage of light from the source 32 to the lens 36. These elements are more clearly illustrated in FIGURE 6, where the lens 36 and the mirror 37 are shown in detail. To retrieve an image which has been recorded upon the record medium 30, the mirror 37 is swung into the position shown in FIGURE 6, and a light source 41 is energized. The light from the source 41 is collected by a lens 42 and directed through a filter 43 upon the surface of the mirror 37, from which it is reflected through the collecting lens 36 and the record medium 30 to a lens 48. From the lens 48, the image is directed through an optical path including plane mirrors 44, 45, and 46 and is projected upon a ground glass screen 47. In the practical application of this invention, the image upon the ground glass screen 47 is of a size viewable by the naked eye. It may be pointed out, however, that this projected image may be of any convenient size and not only may be viewable to the naked eye but may be projected upon an electronic sensing arrangement such as a photo-cell matrix. In this case, the image may be smaller than has been indicated herein.

Because of the differences in characteristics of the several phototropic compounds, it has been found to be convenient to use two light sources, one for recording and erasing, if required, and one for image retrieval. It is not necessary to the invention, however, that two light sources be employed.

Because the pattern upon phototropic materials is blue instead of black, as with silver salt compounds, the filter 43 may be included in the retrieval light path and is selected to pass those colors which provide the most satisfactory contrast between the pattern and the background of the projected image.

In the event that a selected image is to be erased, the filter 35 may be replaced by another filter which passes the light from the source 32 which is of the proper color to erase the image recorded upon the record medium 30. It may be pointed out, however, that this characteristic of certain phototropic materials forms no part of this invention but has been brought out merely to indicate the versatility and flexibility of a recording medium using materials of this type as the activatable medium rather than a silver haloid film, for example, which is generally incapable of being erased through the introduction of a specific colored light.

Figure 12:
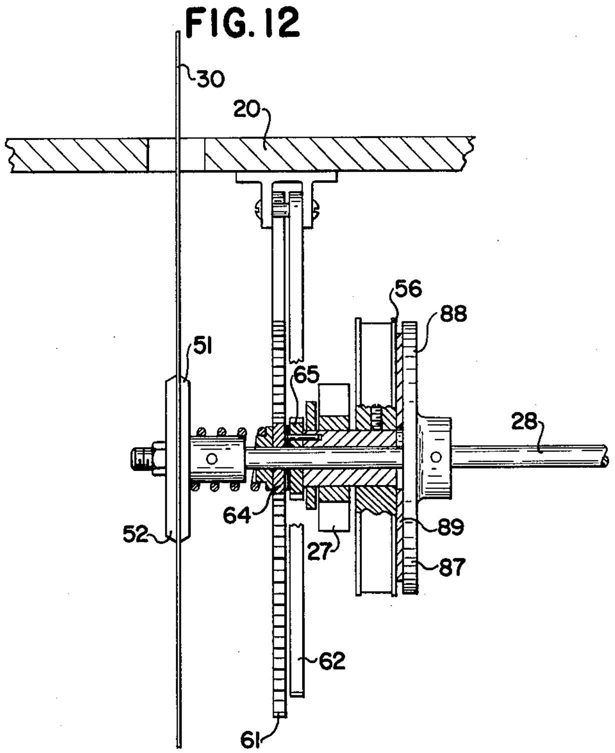
FIGURE 12 is a fragmentary view, partially in cross-section, of the clutch arrangement employed in this embodiment.

Since the lens 48 is rigidly attached to the plate 20 by a bracket 50, it is apparent that, to bring selected increments of the surface of the circular record medium into register therewith, it is necessary that the record medium be moved relative thereto. In view of this, the circular record medium may be rotated about its axis and also moved in a substantially radial direction so that not only the outer edge of the surface area but also the surface area nearer the center may be brought into register with the optical system. As has been previously brought out, the shaft 28 is mounted across the outer extremities of the parallel arm members 26 and 27 in such a manner that it may be rotated about its axis. Therefore, the record medium 30 is secured to the end of the shaft 28, which will position the recording surface area thereof within the light path of the optical system, by means of a threaded collar arrangement 51 and 52, which not only provides for a substantial mounting but also facilitates the removal and remounting of another record medium. To provide the driving power for this unit, an electric motor 53 is employed. This motor may be any of the conventional types well known in the art and rotates the shaft 28 and the record medium 30 through a belt 54, which is driven by a pulley 55 and in turn drives a shaft pulley 56 through a conventional slip clutch arrangement, the details of which are illustrated in FIGURE 12.

The revolving motion imparted to the shaft member 28 and the record medium 30 is converted into substantially radial motion by spur gears 64 and 65 (FIGURE 12), which may be selectively engaged with respective curved rack members 61 and 62. Assuming that the motor 53 drives the shaft 28 clockwise when viewed from the end of the shaft 28 upon which the record medium 30 is mounted, the engagement of the spur gear 64 with the curved rack 61 moves the revolving shaft 28, the circular record medium 30, and the arm members 26 and 27 in a substantially radial direction downward, as the arm members 26 and 27 pivot about the axle member 23 of the supporting unit comprising the members 21 and 22 and the axle member 23. Without changing the direction of rotation of the motor 53, the engagement of the spur gear 65 with the curved rack member 62 moves the revolving shaft member 28, the circular record medium 30, and the arm members 26 and 27 in a substantially radial direction upward as the arm members 26 and 27 pivot about the axle member 23 of the supporting unit previously described. It may be readily seen that, with this arrangement, the rotating shaft member 28 and the record medium 30 may be driven in either one of two substantially radial vertical directions without reversing the direction of rotation of the motor 53.

To selectively engage the spur gears 64 and 65 with the curved rack members 61 and 62, respectively, a drive solenoid 63 is provided and is mounted upon the arm member 27 (FIGURE 3). Also mounted upon the arm member 27 is a plate 70, which is free to slide parallel to the longitudinal axis of the arm 27. The plate 70 is guided by a screw 73 and the shaft 28, which engage slots 71 and 72, respectively. The armature 74 of the solenoid 63 is connected through a spring 66 to the sliding plate 70. With the solenoid 63 in the unenergized state, a tension spring 75 draws the sliding plate 70 to its far right position (FIGURE 3). In this position, an idler roller 76 is held against the edge opposite the teeth of the rack 61. This forces the rack 61 to the right (looking at FIGURE 3) as it pivots about the point 67, thereby enabling the teeth of the spur gear 64 to mesh with the teeth of the rack 61. Upon this engagement, the rotating shaft 28 and the record medium 30 are driven in a substantially radial downward direction. To reverse the radial direction of the rotating shaft 28 and the record medium 30, the solenoid 63 is energized, thereby pulling its armature 74 to the left (FIGURE 3), which also pulls the sliding plate 70 to the left. This removes the idler roller 76 from contact with the back of the rack 61 and permits it to swing to the left out of engagement with the spur gear 64. As the sliding plate 70 moves farther to the left, an idler roller 78 is brought into contact with the back of the rack 62, thereby forcing the rack 62 to the left as it pivots about the point 79. The teeth of the spur gear 65 are then engaged with the teeth of the rack 62. Upon this engagement, the rotating shaft 28 and the record medium 30 are driven in a substantially radial upward direction. A spring 68 is provided to overcome the force of gravity acting upon the rack 62 while the drive solenoid 63 is in its unenergized condition, so that the teeth of both of the spur gears 64 and 65 are not engaged with the teeth of the respective racks 61 and 62, simultaneously.

While the motion produced by the engagement of the teeth of the spur gears 64 and 65 with the racks 61 and 62 has herein been described as substantially radial, it is pointed out that the motion thus produced is not purely radial, in that the shaft 28 is actually displaced through an arc about the pivotal mounting of the mechanical linkage arms 26 and 27 upon the axle 23 of the supporting unit, previously described. However, since the images may be recorded and later retrieved while the revolving shaft and the record medium are in the same relative positions, this slight arc of angular displacement has no effect upon the operation of the unit.

From this description, it is apparent that the record medium 30 is rotated about its axis by the motor 53 driving the shaft 28 through the belt 54 and is displaced substantially radially by the combination of spur gears 64 and 65, which are rotated with the shaft 28 and associated gear racks 61 and 62, respectively. Because of these two motions which may be imparted to the record medium 30, the images are retained in a plurality of concentric recording tracks, each having the same number of images, extending circumferentially around the recording surface area of the record medium 30, with the corresponding images of each track being located within the same sector of the record medium. With this arrangement, any image retained in any recording track may be brought into register with the optical system by revolving the record medium, and any recording track may be brought into register with the optical system by displacing the record medium substantially radially by the spur gears 64 and 65 and the respective associated racks 61 and 62.

As the record medium 30 is of circular configuration, it may be said that the corresponding images of the several recording tracks of recorded images extending substantially radially outwardly from the center toward the circumference of the medium constitute a column of recorded images located within one minor sector of the circular recording area of the record medium 30. In a practical application of this unit, it was found that five hundred images, each fifty thousandths of an inch square, could be recorded about each recording track which extends circumferentially about the record medium. Therefore, the record medium may be thought of as being divided into five hundred columns or minor sectors. To select any one of these five hundred minor sectors, the rotation of the record medium 30 and the rotatable shaft 28 must be stopped when the selected minor sector is in register with the lens system 36 and 48. To effect sector selection, a coarse sector indexing means comprising a rotating index wheel 80 (FIGURES 1, 2, and 3) is provided and is keyed to the shaft 28. Extending about the periphery of the index wheel 80 is a series of lobes or teeth, typically illustrated at 81. In a practical application of this unit, it was found highly satisfactory to divide the record medium 30 into fifty major sectors by supplying the index wheel 80 with fifty such lobes or teeth 81, each tooth corresponding to a major sector. As there are five hundred minor sectors to be selected around the recording medium 30, each of the lobes or teeth 81 and the major sector thus determined represent ten minor sectors. For purposes of this specification, the selection of major sectors by the index wheel 80 will be referred to as the coarse sector selection, and the selection of minor sectors within each major sector will be referred to as the fine sector selection.

The coarse and fine selections of sectors are made through a system of push buttons which energize solenoids at the proper time. This system will be explained in detail later in the specification; however to illustrate how the fine sector selection is effected, the mechanical portions only will be discussed at this time. To stop the index wheel 80 at the proper coarse selection, a coarse sector selector pawl 82 (FIGURES 1 and 2), pivoted about a point 83, is provided. Energization of the coarse sector selector solenoid 85 pulls the edge of the coarse sector selector pawl 82 into the path of the teeth around the periphery of the index wheel 80. Upon the engagement of the selected tooth by the pawl 82, the rotation of the index wheel 80, the shaft 28, and the record medium 30 is stopped, and the coarse sector selection is effected.

The motor 53 is connected to the rotating shaft 28 through a friction-type slip clutch 87, which permits the motor to rotate while the index wheel 80, the rotating shaft 28, and the record medium 30 are held by the engagement of the coarse sector pawl 82 with one of the teeth 81. FIGURE 12 illustrates an acceptable friction clutch arangement. Located between the shaft pulley 56 and a plate 88, keyed to the shaft 28, is a friction member 89. While the shaft 28 is free to rotate, it is driven by the frictional engagement of the member 89 with the pulley 56 and the plate 88. When the shaft 28 is locked by the engagement of a tooth in the index wheel 80 by the pawl 82, the frictional engagement is overcome, and the pulley 56 no longer drives the plate 88.

Upon the completion of the coarse sector selection operation, fine sector indexing is effected by the fine sector indexing means now to be described. An arm 84, upon which the coarse sector selector pawl 82 is mounted, is also pivotally mounted upon the rotating shaft 28, as indicated in dotted lines in FIGURE 2, and is free to rotate independently of and about the rotating shaft 28 through a small angle of displacement. Pivotally attached, at the point 90, to the arm 84 is a flat sliding member 91, which is free to slide horizontally along the edge of a rigid member 92 and is guided by brackets 93 and 94. It may be noted that the rigid member 92 is securely bolted to the plate 20 by bolts 95 and 96. Carried by the sliding member 91 are fine sector selector racks 100 and 101, each having five teeth, and a bracket 102, which carries electrical contacts which brush fine sector selector commutators 103 and 104. As there are ten minor sectors within the selected major sector which may be now selected, the fine selector racks 100 and 101 are provided. In a practical application, it was found desirable to provide two fine selector racks, which permitted the spacing between the teeth of each rack to be twice that possible with only one rack, thereby providing increased selection reliability. These fine sector selector racks are located on the slide 91 and are positioned relatively to each other in such a manner that the rack 100 selects the even-numbered positions, while the rack 101 selects the odd-numbered positions. That is, the first tooth of the rack 101 selects position "1," the first tooth of the rack 100 selects position "2," the second tooth of the rack 101 selects position "3," the second tooth of the rack 100 selects position "4," etc.

In the normal position, the slide 91 is held in the extreme right position (FIGURE 2) by a tension spring member 109, which is secured through a bracket 110 to the plate 20. As the coarse sector selection operation is effected and the coarse sector selector pawl 82 engages one of the teeth 81 in the index wheel 80 as it revolves counter-clockwise (FIGURE 2), the inertia of the rotating mass exerts a force which acts through the coarse sector selector pawl 82 to the arm 84, forcing the arm 84 and the attached sliding member 91 to the left, as viewed in FIGURE 2. This movement, of course, carries the fine selector racks 100 and 101 and the bracket 102, carrying the electrical contacts which brush the fine sector selector commutators 103 and 104, to the left. When the inertial force is expended, the slide 91 is moved to the right, as viewed in FIGURE 2, by the tension spring 109. As the slide 91 is drawn to the right by the tension spring 109, it carries therewith the fine sector selector racks 100 and 101 and the bracket 102. The brush members carried by the bracket 102 now successively contact the commutator segments of the respective fine sector selector commutator elements 103 and 104 until an electric circuit which is set up through a push button arrangement, to be explained later, is completed. The completion of this circuit energizes a fine sector selector solenoid 115 or 116. The energization of the fine sector selector solenoid 115 operates to pull the edge of a fine sector selector pawl 117, which pivots about a point 118, into the path of the teeth of the fine selector rack 101, while the energization of the fine sector selector solenoid 116 operates to pull the edge of the fine sector selector pawl 119, which pivots about the point 120, into the path of the teeth of the fine sector selector rack 100. Upon engagement of either of these pawls with a tooth in the corresponding fine sector selector rack, the movement of the slide 91 to the right is stopped, and the fine sector selection is effected, bringing the selected minor sector into register with the optical system lens 36 and 48.

To effect recording track selection, a coarse track indexing means comprising a coarse track selector rack 125 (FIGURE 3) is secured to the end of and movable with the arm 27. This coarse track selector rack 125 contains four teeth or nodes, typically illustrated at 124, which effectively divide the record medium 30 into four track areas. In a practical application of a unit of this invention, there were eighty recording tracks on the record medium, or twenty tracks per tooth. To select a track, the revolving shaft 28 and the record medium 30 are driven down the rack 61 through the action of the spur gear 64 in a manner previously described.

As the shaft 28 and the record medium 30 are displaced radially downward, the arm 27 is carried along. Attached to the arm 27 is a commutating switch operating linkage comprising an arm 257 and a slide 258. As the arm 257 is actuated by the travel of the arm 27, vertical motion is imparted to the slide 258, which is guided by ways in a bracket 259. Spaced along the ways in the bracket 259 are a series of commutating switches, which may be conventional electrical switches, and which are successively operated by the slide 258 during its vertical travel. The selection of the selected track area is made through a key on a conventional keyboard, to be described later, and a circuit for energizing a coarse track selector solenoid 128 (FIGURES 2 and 4) is established when the corresponding commutating switch in the ways of the bracket 259 is operated by the slide 258. The energization of the coarse track selector 128 operates to pull the edge of a coarse track selector pawl 129 into the path of the teeth of the coarse track selector rack 125.

Figure 4:
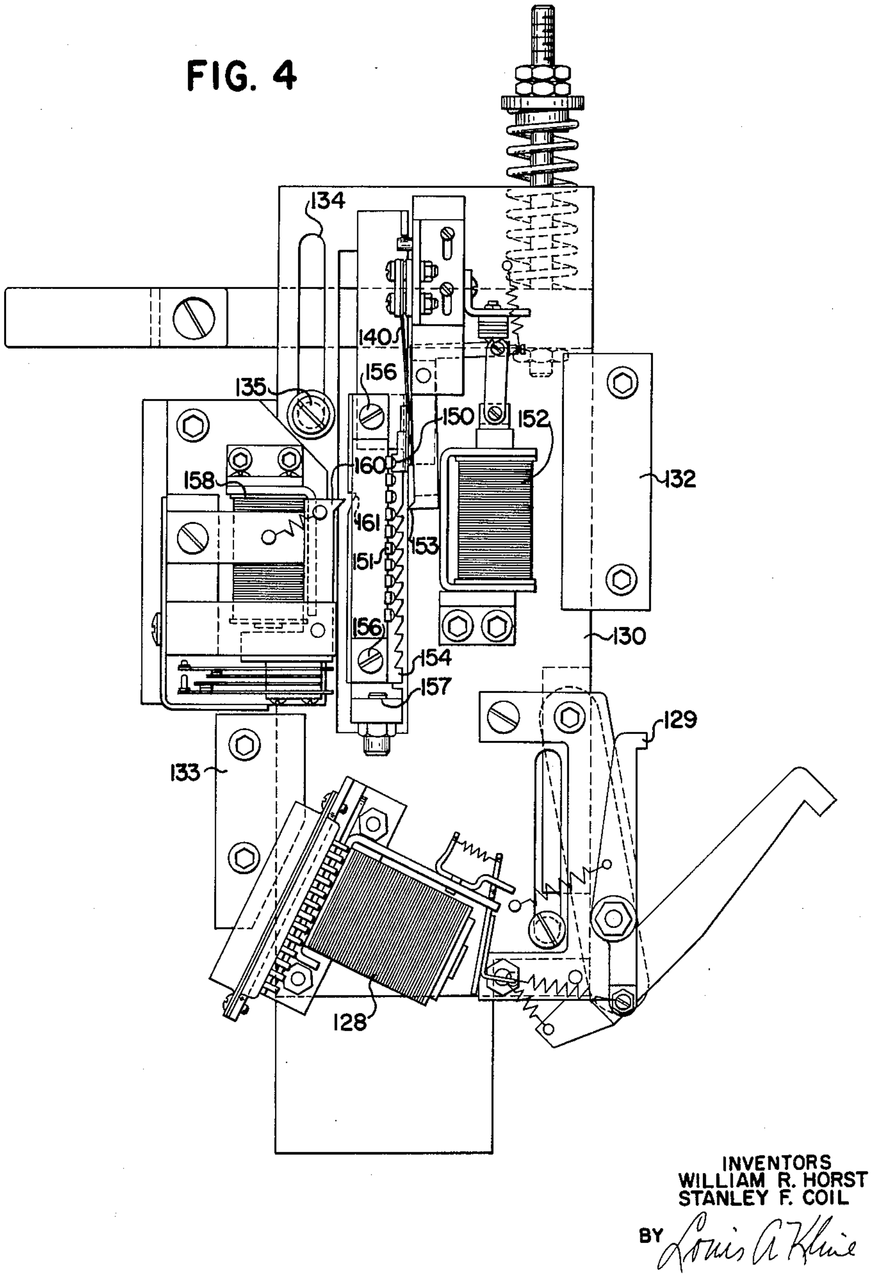
FIGURE 4 is an enlarged view of the fine track selecting mechanism of the unit of this invention.
Figure 5:
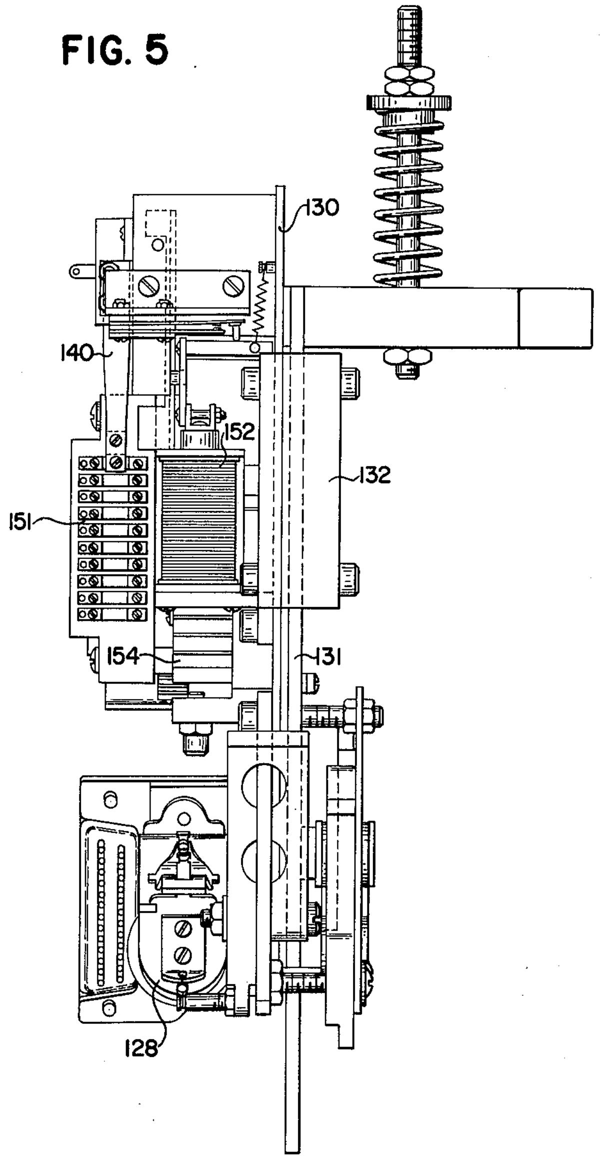
FIGURE 5 is a side view of FIGURE 4 as it appears from the right side of FIGURE 4.

The engagement of the coarse track selector pawl 129 with a tooth of the coarse track selector rack 125 operates the fine track selecting mechanism illustrated in FIGURES 4 and 5. A fine track selecting mechanism slide 130, which is arranged to slide upon a supporting member 131 through guides 132 and 133 and a slot 134, which contains a screw member 135, is activated by the coarse track selector pawl 129. As the pawl 129 is engaged by one of the teeth 124 of the selector rack 125, the slide 130 is driven vertically, as viewed in FIGURE 4. As the slide 130 is driven vertically, an arm 140 and a brush 150 are carried along. Through this travel, the brush 150 successively contacts the segments of a fine track selector commutator 151. When the brush 150 contacts the segment of the fine track selector commutator 151, which completes an electrical circuit as set up through a push button arrangement, to be explained later, a fine track selector solenoid 152 is energized. The energization of the fine track selector solenoid 152 operates through a mechanical linkage to direct a fine track selector pawl 153 (FIGURE 4) into the path of the teeth of a fine track selector rack 154. It may be noted that the fine track selector commutator element 151 and the fine track selector rack 154 are mounted upon the mounting plate 131 in such a manner that they may be moved vertically relative to the plate 131 and independently of the slide 130. As the fine track selector pawl 153 engages one of the teeth in the fine track selector rack 154, the downward motion of the slide 130 is stopped when the fine track selector rack 154 bottoms on a stop 157 or when an auxiliary stop pawl 160 engages an auxiliary stop notch 161. When the downward motion of the slide 130 is stopped, the downward motion of the shaft 28 and the record medium 30 is also stopped, because the pawl 129 is still engaging a tooth in the rack 125, and the selected track is in register with the optical system lenses 36 and 48.

Because there are actually twenty tracks represented by each of the teeth 124 of the coarse track selector rack 125, the fine track selector rack 154 should have twenty teeth. To reduce the length of this rack, the auxiliary stop pawl 160 is provided and is arranged to engage the auxiliary stop notch 161, which reduces the vertical movement of the slide 130. When the pawl 160 engages the notch 161, the selector rack 154 does not bottom on the set screw 157, and the vertical travel of the slide 130 is reduced by a distance equal to one recording track about the record medium 30. Therefore, through the actuation of the pawl 160, twenty separate track selections may be made with the ten teeth of the fine track selector rack 154.

Figure 8:
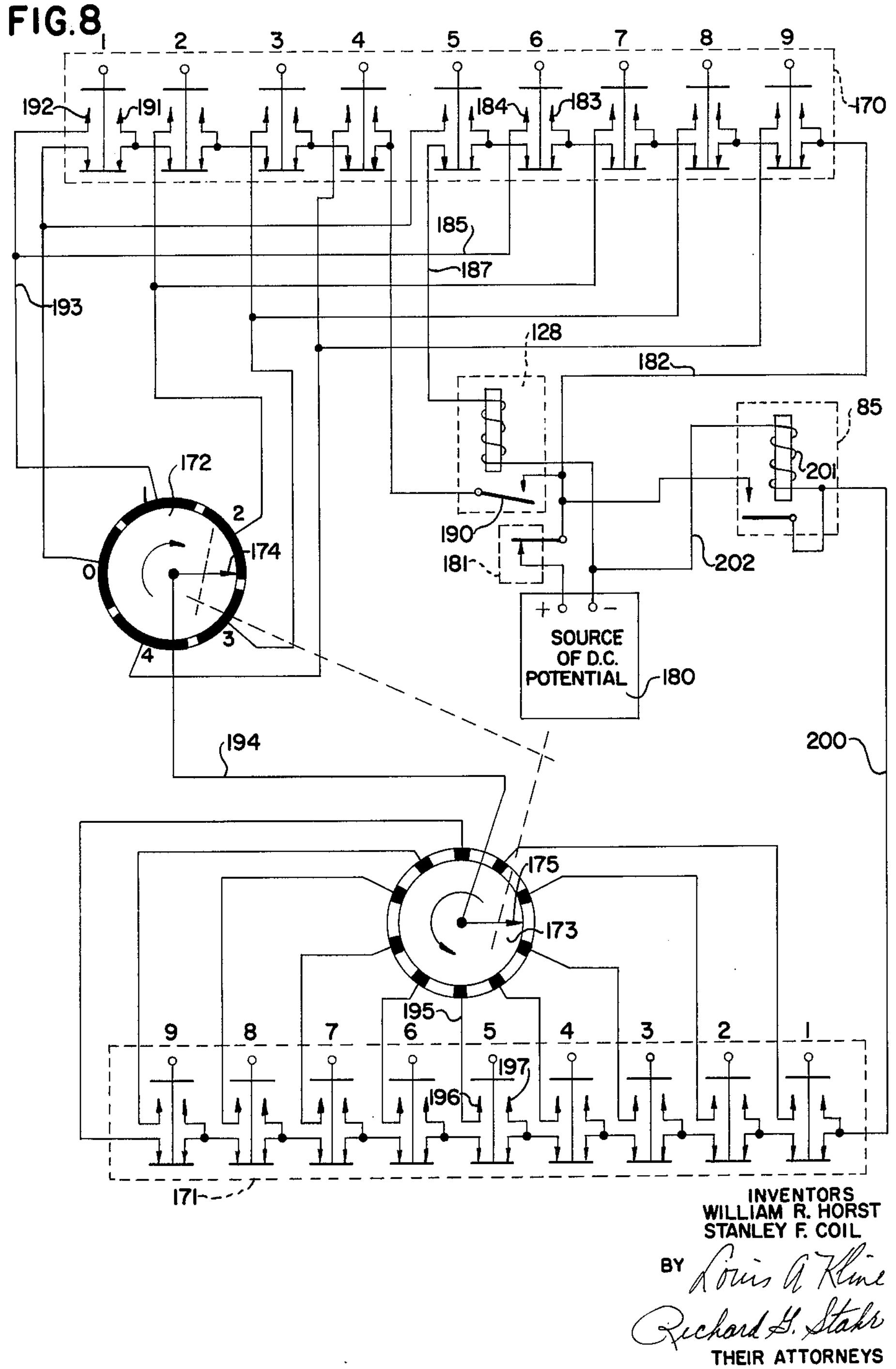
FIGURE 8 is a schematic diagram of the electrical circuitry for effecting coarse sector selection about the record medium.

Referring now to FIGURES 8, 9, 10, and 11, the electrical circuitry for operating the mechanical selecting linkages just described is diagrammatically illustated. FIGURE 8 shows two keyboards 170 and 171, each of ten double pole double throw key-type switches, and two timing commutators 172 and 173. The commutator 172 contains five segments, which are brushed by an armature 174, while the commutator 173 contains ten segments, which are brushed by an armature 175. These timing commutators are contained within a housing 176 (FIGURE 1) and may be of conventional design well known in the art. The armature 174 of the commutator 172 and the armature 175 of the commutator 173 are connected together in series electrically and are mechanically geared to each other in such a manner that the armature 175 of the commutator 173 makes five revolutions to every one revolution of the armature 174 of the commutator 172. This is done through a simple gearing arrangement which is driven by the rotating shaft 28 and need not be detailed for purposes of this specification. The commutator 172 electrically divides the teeth of the index wheel 80 into five arcs of ten teeth per arc, while the commutator 173 electrically selects a specific tooth within each arc. Therefore, through the interaction of these two timing commutators and the keys of the keyboards 170 and 171, any one of the fifty teeth of the index wheel 80 may be electrically selected. In this regard, the keyboard 170 determines the selected one of the five arcs of ten teeth, while the keyboard 171 determines the selected tooth within any of the arcs. Therefore the keys of the keyboards 170 and 171 are the electrical switching circuit means through which coarse sector selection may be effected.

Assuming that key 6 of the keyboard 170 and key 5 of the keyboard 171 are depressed and that the rotating shaft 28 is driving the armatures 174 and 175 of the respective timing commutators 172 and 173, a circuit may be traced from a source of D.C. potential 180 through a switch 181, which may be a manual switch of any type to turn on the machine, a line 182, the normally closed contacts of keys 9, 8, and 7 of the keyboard 170, the closed contacts 183 and 184 of key 6, line 185, and line 193 to the commutator segment labeled 1 of the commutator 172. It may noted that, with key 6 of the keyboard 170 depressed, the circuit to auxiliary stop solenoid 158 (FIGURE 4) is broken, and the auxiliary stop pawl 160 is not engaged with the auxiliary stop notch 161. Under this condition, the fine track selector rack 154 may be moved to its lowest stop position, as determined by the stop 157. Should any of keys 1 through 4 of the keyboard 170 be depressed, a circuit may be traced from the source of D.C. potential 180, through switch 181, line 182, the normally closed contacts of keys 9, 8, 7, 6, and 5 of the keyboard 170, line 187, and the coil of the auxiliary stop solenoid 158 to the negative side of the potential source 180. This, of course, energizes the solenoid 158 and operates to engage the pawl 160 (FIGURE 4) with the notch 161, thereby reducing the vertical motion of the fine selector rack 154 by a distance equal to one recording track about the record medium 30. Assuming that key 1 of the keyboard 170 is depressed, the energized coil of the solenoid 158 closes the associated normally open contacts 190, which establishes a parallel circuit which may be traced from a source of D.C. potential 180, through switch 181, the now closed contacts 190 of the solenoid 158, the normally closed contacts of keys 4, 3, and 2 of the keyboard 170, the now closed contacts 191 and 192 of key 1 of the keyboard 170, and line 193 to the commutator segment labeled 1 of the timing commutator 172. Although the same arc of the index wheel 80 may be selected by two keys of the keyboard 170, as determined by the segment of the commutator 172 which is energized, either one of two adjacent recording tracks may be selected by the vertical selecting mechanism, depending upon whether the solenoid 158 is energized or not. In this respect, the sector selection operation influences the track selection operation.

As the armature 174 of the timing commutator 172 revolves clockwise, as viewed in FIGURE 4, and contacts segment 1, the circuit which has been previously traced may be extended through the armature 174 and line 194 to the armature 175 of the timing commutator 173. A ten-notch arc of the index wheel 80 has, therefore, been selected by the timing commutator 173 through one of the keys of the keyboard 170. As the armature 175 revolves and contacts the segment corresponding to key 5 of the keyboard 171, this circuit may be further extended through line 195, the now closed switch contacts 196 and 197 of key 5, the normally closed contacts of keys 4, 3, 2, and 1, line 200, coil 201 of the coarse sector selector solenoid 85, and line 202 to the negative terminal of the D.C. potential source 180. This, of course, energizes the coarse track selector solenoid 85, which is shown in detail in FIGURES 1 and 3, and causes the coarse sector selector pawl 82 (FIGURES 1, 2, and 3) to engage one of the notches 81 of the index wheel 80 in a manner previously described. The single notch within the ten-notch segment has thus been selected by the timing commutator 173 and a key of the keyboard 171, thereby effecting the coarse sector selection when the major sector of the record medium 30 which includes the selected sector is in register with the optical system. Upon the engagement of a notch of the index wheel 80, the inertia of the rotating mass of the wheel 80, the shaft 28, and the record medium 30 forces the slide 91 (FIGURE 2) to the left until the force of inertia has been overcome by the tension force of the spring 109. At this point, the slide 91 begins moving to the right, and the contacts carried by the bracket 102 successively brush the various segments of the fine sector selector commutators 103 and 104, and the index wheel 80 begins to rotate in the reverse direction.

Figure 9:
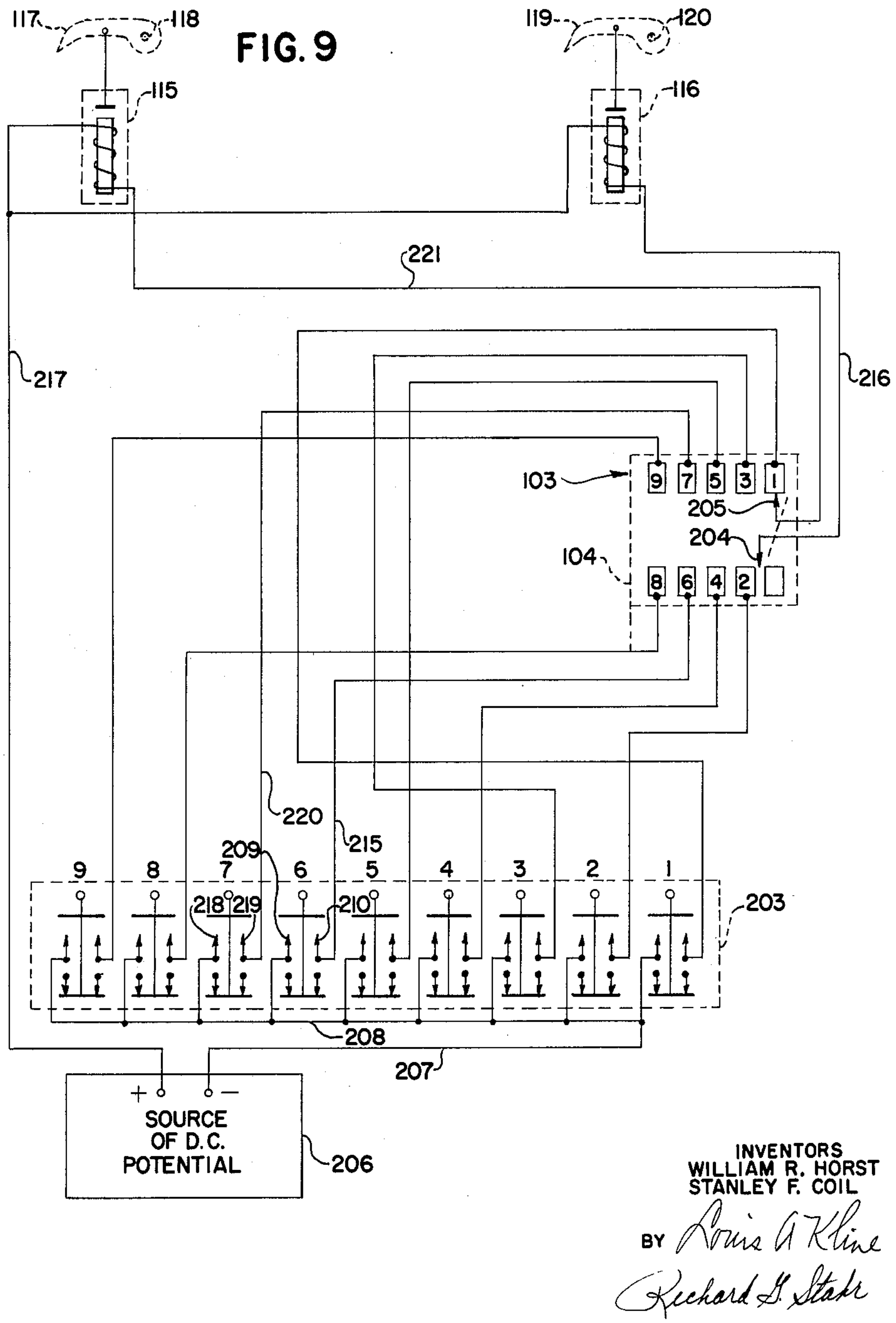
FIGURE 9 is a schematic diagram of the electrical circuitry for effecting fine sector selection after the coarse selection has been made.

Assuming that key 6 of the keyboard 203 of FIGURE 9 is depressed, as the slide 91 begins moving to the right under influence of the spring 109, contact 205 (FIGURE 9), which is carried by the bracket 102 (FIGURE 2), successively brushes the fine sector selector commutator segments of the fine sector selector commutator 103, while contact 204 (FIGURE 9) successively brushes the commutator segments of fine sector selector commutator 104 (FIGURE 2). The slide 91 continues to move to the right until the contact 204 contacts the segment of the fine sector selector commutator 104 labeled 6, thereby completing an electrical circuit which may be traced from a source 206 of D.C. potential, through line 207, line 208, the now closed contacts 209 and 210 of key 6, line 215, commutator segment 6, contact 204, line 216, the coil of the fine sector selector solenoid 116, and line 217 to the negative terminal of the D.C. potential source 206. This energizes the fine sector selector solenoid 116, which causes the fine sector selector pawl 119 (FIGURE 2) to pivot downwardly about its pivot point 120 and into the path of the teeth of the fine selector rack 101, in which it engages a tooth which stops the reverse rotation of the record medium 30 at the desired minor sector, thereby effecting the fine sector selection.

Should key 7 of the keyboard 203 be depressed, a similiar circuit may be traced from the source 206 of D.C. potential, through line 207, line 208, the now closed contacts 218 and 219 of key 7, line 220, the commutator segment marked 7 of the fine sector selector commutator 103, movable contact 205, line 221, the coil of the fine sector selector solenoid 115, and line 217 to the negative terminal of the D.C. potential source 206. The completion of this circuit, of course, energizes the coil of the fine sector selector solenoid 115, which causes the fine sector selector pawl 117 to pivot downwardly about its pivot point 118 and into the path of the teeth of the fine sector selector rack 100, where it engages a tooth. This procedure may be followed through any of the keys and need not be gone into in detail at this time, since each differs only in specifics. It may be noted that only the normally open contacts of the double throw double pole keys of the keyboard 203 are used, the normally closed contacts not entering into the circuit as at present designed. These contacts may be used for additional interlocking systems should they be necessary or desirable. In this manner, the switching circuit means of the keyboard 203 are used to effect fine sector selection.

Figure 10:
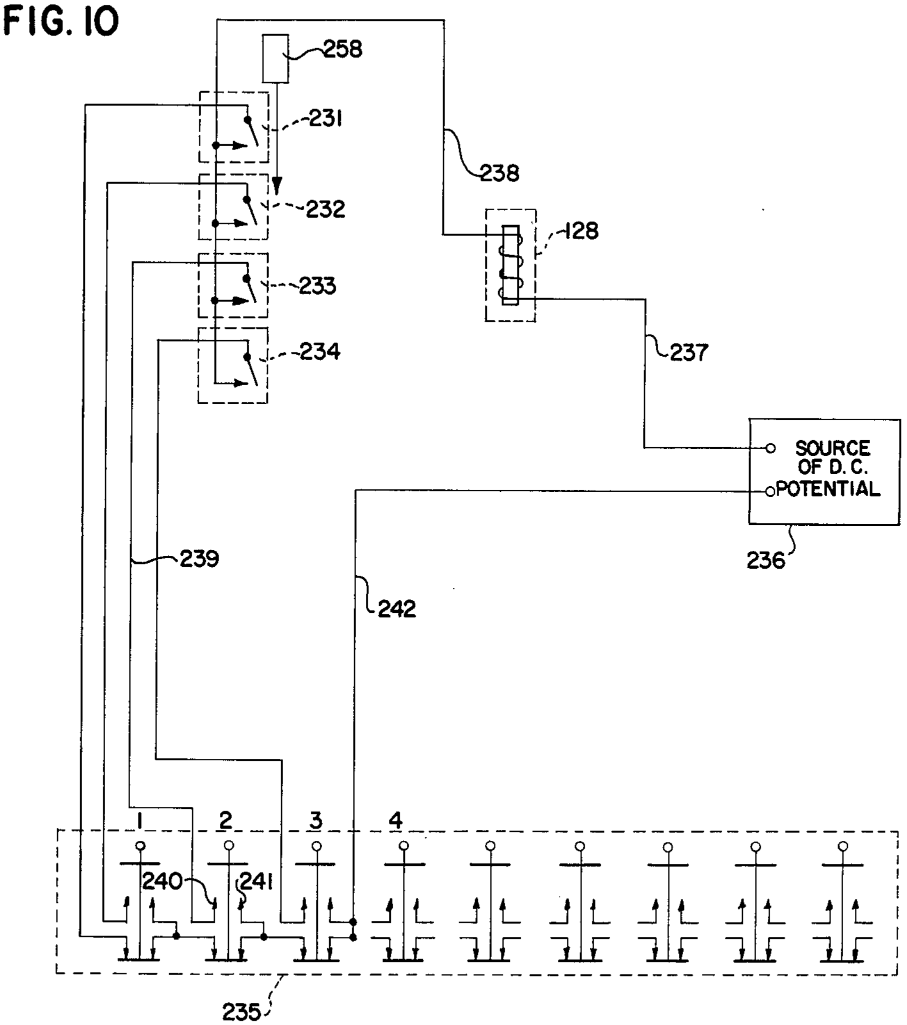
FIGURE 10 is a schematic diagram of the electrical circuitry for effecting the coarse track selection by the track selecting mechanism.
Figure 11:
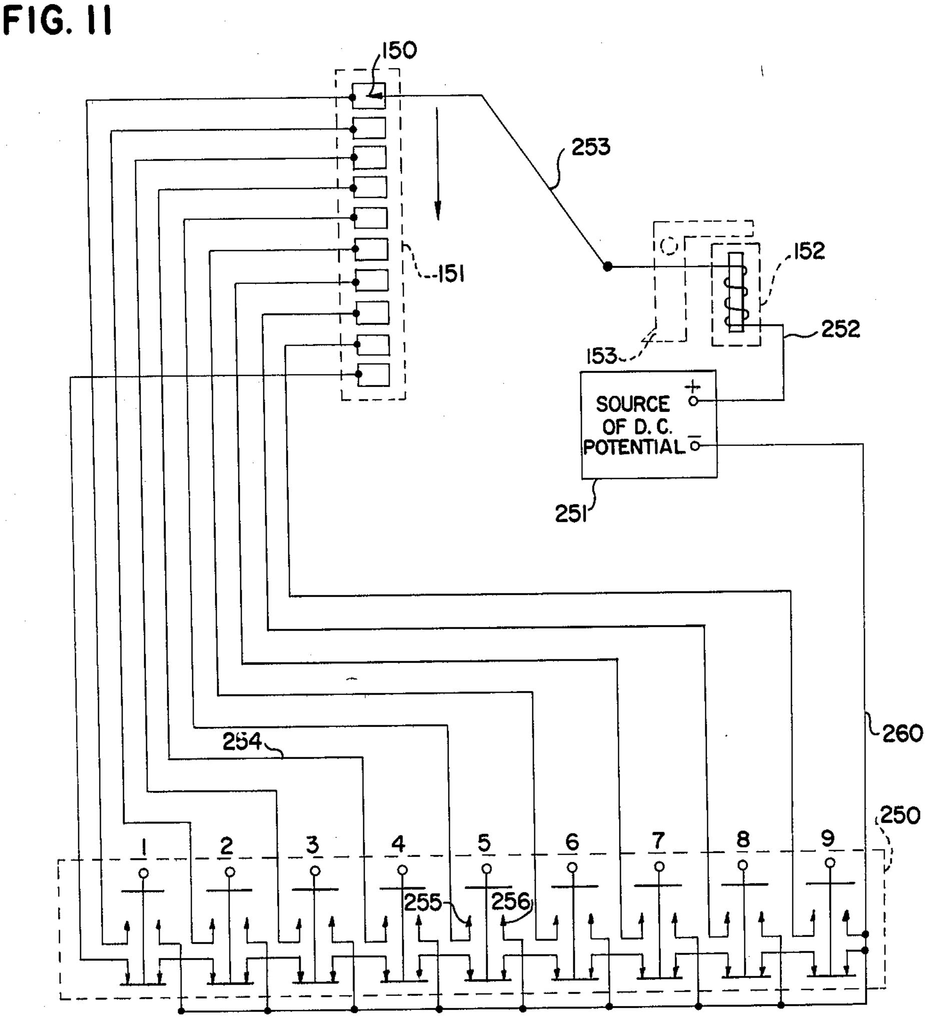
FIGURE 11 is a schematic diagram of the electrical circuitry for effecting the fine track selection by the fine track selecting mechanism after the coarse track selection has been made.

FIGURES 10 and 11 set forth schematically the electrical circuit for selecting the reading track about the record medium 30, which is positioned in a manner previously described. As the spur gear 64 (FIGURE 3) engages the teeth in the curved rack 61, the arms 26 and 27, along with the rotating shaft 28, the indexing wheel 80, and the record medium 30, are driven in a substantially radial downward direction, as viewed in FIGURES 3 and 10. The arm 257 follows the arm 27 and carries the slide 258 vertically along the ways of the bracket 259. The slide 258 successively operates the commutating switches positioned in the ways of the bracket 259, each of which corresponds to a respective tooth in the coarse track selector rack 125 of FIGURE 3. Assuming that key 2 of the keyboard 235 (FIGURE 10) is depressed, as the slide 258 moves downwardly, as seen in FIGURE 10, it successively operates the associated commutating switches 231, 232, 233, and 234 in the ways of the bracket 259 until the switch corresponding to notch 2 of the coarse track selector rack 125 is operated. At this time, an electrical circuit is completed which may be traced from a source of D.C. potential 236, through line 237, the coil of the coarse track selector solenoid 128, also shown in FIGURES 4 and 5, line 238, closed switch 233, line 239, the now closed switch contacts 240 and 241 of key 2, the normally closed contacts of key 3, and line 242 to the negative terminal of the source of D.C. 236. The energization of the coil of the coarse track selector 128 (FIGURE 4) pulls the coarse track selector pawl 129 into contact with the proper tooth of the coarse track selector rack 125, thereby selecting the proper track area. However, the motion of the coarse track selector rack 125 interacting with the coarse track selector pawl 129 continues and drives the slide 130 (FIGURE 4) downwardly, thereby drawing the contacts 150, carried by the arm 140, past the segments of the fine track selector commutator 151. Assuming that key 5 of keyboard 250 (FIGURE 11) is depressed, as the contact 150 brushes past the various segments of the fine track selector commutator 151, the segment corresponding to key 5 is contacted, and an electrical circuit is completed which may be traced from a source of D.C. potential 251, through line 252, the coil of the fine track selector solenoid 152, line 253, movable contact 150, commutator segment 5, line 254, the now closed contacts 255 and 256 of key 5, and line 260 to the negative terminal of the D.C. potential source 251. The completion of this circuit energizes the coil of the fine track selector solenoid 152 (FIGURE 4), thereby pulling the fine track selector pawl 153 into engagement with one of the teeth of the fine track selector rack 154, in a manner perviously described. Upon engagement of the fine track selector pawl 153 with one of the teeth of the fine track selector rack 154, the rack 154 is driven to its stop position as determined by the set screw 157 or, in the event the auxiliary stop solenoid 158 is energized, by the auxiliary stop pawl 160 engaging the auxiliary stop notch 161. Whether or not this relay is energized is, of course, determined by the selection made in connection with FIGURE 8, as has been previously described. The keys of the keyboards 235 and 250 constitute the switching circuit means for effecting coarse and fine track selection.

By the proper manipulation of the switching circuit means included in the keyboards of the unit of this invention, any incremental area around the record medium 30 may be selectively registered with the optical system, so that images may be projected thereon or retrieved therefrom by projection means. It may be noted that several of the keys of the various key banks have not been used in connection with the description of this unit. In the manufacture of a practical unit, additional keys were incorporated in the event that additional control features may later be required. The additional keys of course, in no way affect the operation of the unit as described herein but may be very useful in later adding additional desirable features.

The operation of the unit of this invention has been described relative to the use of push-button-type keys for the purpose of supplying input information. It is to be specifically understood, however, that input information may be generated by and supplied from a remote source such as a computer.

An important feature of the unit of this invention is the simple but reliable focusing means by which the recording surface of the record medium 30 may be accurately located precisely at the focal point of the optical system. Referring to FIGURE 6, the bracket 50, which supports the stationary lens 48, is provided with a vertical member 280, which serves as a focus stop member and includes an aperture 281, which is in register with the stationary lens 48. A movable lens 36 is contained within a cylinder 282, which is slidably supported by a barrel member 283. Upon the energization of a focus solenoid 285, an armature 286 is drawn to the right. This movement of the armature 286 causes a lever 290 to rotate about its pivot 291, thereby resulting in a movement of the end 289 of the lever 290 to the left.

A pawl which is carried by the lever 290 engages a collar 292 on the cylinder 282 and moves the cylinder 282 and the movable lens 36 to the left until the record medium 30 is firmly seated against the aperture 281 in the focus stop member 280, which is located at the focal point of the optical system. Because the record medium 30 is of a flexible material, it is capable of yielding to this motion without being intolerably stressed or appreciably distorted. The motion to the left of the end 289 of the arm 290 produces a clockwise rotation of the member 295 about its pivot 296, through the action of the link 297.

Upon the release of the focus solenoid 285, the end 289 of the lever 290 is pulled to the right by a tension spring 300, which tends to revolve the member 295 counter-clockwise about its pivot 296. Counter-clockwise rotation of the member 295 draws the end 289 of the lever 290 to the right, through the link 297. As the end 289 of the lever 290 moves to the right, the pawl carried thereby engages a collar 301 on the cylinder 282, which moves the cylinder 282 and the lens 36 to the right and releases the record medium 30.

In the practical application of this invention, a delay circuit was included in the supply circuit of the focus solenoid 285. The period of delay introduced by this circuit was arranged to be of a duration sufficiently long to permit the selecting mechanism to bring a selected area on the record medium 30 into register with the optical system before the focus solenoid 285 operated.

While a preferred embodiment of the present invention has been disclosed and described, it is obvious to those skilled in the art that various modifications or substitutions may be made without departing from the spirit of the invention as set forth in the appended claims.

What is claimed is:

1. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, means for locating said record medium in the light path of said optical system, means for rotating said record medium whereby any sector thereof may be brought into register with said optical system, means for displacing said record medium substantially radially whereby any recording track thereof may be brought into register with said optical system, electrical circuit means for selecting the said sector and track to be brought into register with said optical system, sector indexing means responsive to said electrical circuit means for bringing a selected sector of said record medium into register with said optical system and stopping the rotational movement of said record medium, and track indexing means responsive to said electrical circuit means for bringing a selected recording track of said record medium into register with said optical system.

2. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, means for locating said record medium in the light path of said optical system, means for rotating said record medium whereby any sector thereof may be brought into register with said optical system, means for displacing said record medium substantially radially whereby any recording track thereof may be brought into register with said optical system, electrical circuit means for selecting the said sector and track to be brought into register with said optical system, coarse and fine sector indexing means responsive to said electrical circuit means for bringing a selected sector of said record medium into register with said optical system, and coarse and fine track indexing means responsive to said electrical circuit means for bringing a selected recording track of said record medium into register with said optical system.

3. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, means for locating said record medium in the light path of said optical system, means for rotating said record medium whereby any sector thereof may be brought into register with said optical system, means for displacing said record medium substantially radially whereby any recording track thereof may be brought into register with said optical system, electrical circuit means for selecting the said sector and track to be brought into register with said optical system, sector indexing means responsive to said electrical circuit means for bringing a selected sector of said record medium into register with said optical system, track indexing means responsive to said electrical circuit means for bringing a selected recording track of said record medium into register with said optical system and stopping the rotational movement of said record medium and focusing means operable upon the completion of the sector and track indexing operations for accurately locating said recording surface of said record medium at the focal point of said optical system.

4. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, means for locating said record medium in the light path of said optical system, means for rotating said record medium whereby any sector thereof may be brought into register with said optical system, means for displacing said record medium substantially radially whereby any recording track thereof may be brought into register with said optical system, electrical circuit means for selecting the said sector and track to be brought into register with said optical system, coarse and fine sector indexing means responsive to said electrical circuit means for bringing a selected sector of said record medium into register with said optical system, coarse and fine track indexing means responsive to said electrical circuit means for bringing a selected recording track of said record medium into register with said optical system, and focusing means operable upon the completion of the sector and track indexing operations for accurately locating said recording surface of said record medium at the focal point of said optical system.

5. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same minor sector of the recording surface, said recording surface being also divided into a plurality of major sectors, each including the same number of minor sectors, for indexing purposes, an optical system, means for locating said record medium in the light path of said optical system, means for rotating said record medium whereby any sector thereof may be brought into register with said optical system, means for displacing said record medium substantially radially whereby any recording track thereof may be brought into register with said optical system, electrical circuit means for selecting the said sector and track to be brought into register with said optical system, coarse sector indexing means responsive to said electrical circuit means for bringing a selected major sector of said record medium into register with said optical system, fine sector indexing means responsive to said electrical circuit means for bringing a selected minor sector into register with said optical system, and track indexing means responsive to said electrical circuit means for bringing a selected recording track of said record medium into register with said optical system.

6. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, a base member, a supporting unit mounted upon said base member, a rotatable shaft member, mechanical linkage means pivotally mounted upon said supporting unit and arranged to support said shaft member in such a manner that said shaft member may be rotated about its axis and displaced substantially radially about the pivotal mounting of said mechanical linkage means, driving means for rotating said shaft member, a combination of spur gears rotatable with said shaft member and a pair of associated gear rack members for displacing said shaft member substantially radially, means for mounting said circular record medium upon the end of said shaft member which will position the recording surface area of said record medium in the light path of said optical system whereby any sector of said record medium may be brought into register with said optical system by revolving said record medium and any recording track of said record medium may be brought into register with said optical system by displacing said record medium substantially radially, electrical circuit means for selecting said sector and recording track to be brought into register with said optical system, sector indexing means responsive to said electrical circuit means for bringing a selected sector of said record medium into register with said optical system, and track indexing means responsive to said electrical circuit means for bringing a selected recording track of said record medium into register with said optical system.

7. The micro-image storage and retrieval unit defined in claim 6, wherein said sector indexing means includes an index wheel having a plurality of teeth, each of which corresponds to the same number of a plurality of sectors of said record medium for effectively dividing said record medium into a plurality of major sectors, mounted upon and rotatable with said rotatable shaft member and record medium, a plurality of coarse sector selector switching circuit means, each corresponding to a tooth of said index wheel, and a plurality of fine sector selector switching circuit means, each corresponding to a respective one of the sectors of each of said major sectors as determined by said index wheel, for selecting the sector of said record medium to be brought into register with said optical system, a coarse sector selector solenoid energizable by said electrical circuit means, a timing commutator driven by said rotatable shaft member for completing an electrical circuit to said coarse sector selector solenoid through the operated one of said coarse sector selector switching circuit means when the major sector of said record medium which includes the selected sector is in register with said optical system, a coarse sector selector pawl member operated by said coarse sector selector solenoid and arranged to engage a tooth of said index wheel upon the energization of said coarse sector selector solenoid for stopping the rotation of said rotatable shaft member, index wheel, and record medium, a slide member attached to said coarse sector selector pawl member and moved thereby in a first direction by the inertial forces of said index wheel acting through said coarse sector selector pawl member upon the engagement of a tooth of said index wheel, a tension spring member arranged to return the movement of said slide member, index wheel, and record medium as the inertial forces of said index wheel are overcome, first and second fine sector selector rack members mounted upon said slide member, corresponding first and second fine sector selector solenoids energizable by said electrical circuit means, corresponding first and second fine sector selector pawl members mounted adjacent to said sliding member and each arranged to engage a tooth of the corresponding one of said fine sector selector rack members upon the energization of the corresponding fine sector selector solenoid, first and second fine sector selector commutator members mounted adjacent to said slide member, and a pair of electrical contact members mounted upon said slide member and each arranged to brush a respective one of said fine sector selector commutator members for completing an electrical circuit to either of said fine sector selector solenoids through the operated one of said fine sector selector switching circuit means when the selected sector of said record medium is in register with said optical system whereby the corresponding fine sector selector pawl member is brought into engagement with a tooth of the corresponding fine sector selector rack member for stopping the return movement of said slide member.

8. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, a base member, a supporting unit mounted upon said base member, a rotatable shaft member, mechanical linkage means pivotally mounted upon said supporting unit and arranged to support said shaft member in such a manner that said shaft member may be rotated about its axis and displaced substantially radially about the pivotal mounting of said mechanical linkage means, driving means for rotating said shaft member, a combination of spur gears rotatable with said shaft member and a pair of associated gear rack members for displacing said shaft member substantially radially, means for mounting said circular record medium upon the end of said shaft member which will position the recording surface area of said record medium in the light path of said optical system whereby any sector of said record medium may be brought into register with said optical system by revolving said record medium and any recording track of said record medium may be brought into register with said optical system by displacing said record medium substantially radially, electrical circuit means for selecting said sector and track to be brought into register with said optical system, coarse and fine sector indexing means responsive to said electrical circuit means for bringing a selected sector of said record medium into register with said optical system, and coarse and fine track indexing means responsive to said electrical circuit means for bringing a selected recording track of said record medium into register with said optical system.

9. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, a base member, a supporting unit mounted on said base member, a rotatable shaft member, mechanical linkage means pivotally mounted upon said supporting unit and arranged to support said shaft member in such a manner that said shaft member may be rotated about its axis and displaced substantially radially about the pivotal mounting of said mechanical linkage means, driving means for rotating said shaft member, a combination of spur gears rotatable with said shaft member and a pair of associated gear rack members for displacing said shaft member substantially radially, means for mounting said circular record medium upon the end of said shaft member which will position the recording surface area of said record medium in the light path of said optical system whereby any sector of said record medium may be brought into register with said optical system by revolving said record medium and any recording track of said record medium may be brought into register with said optical system by displacing said record medium substantially radially, electrical circuit means for selecting said sector and recording track to be brought into register with said optical system, sector indexing means responsive to said electrical circuit means for bringing a selected sector of said record medium into register with said optical system, track indexing means responsive to said electrical circuit means for bringing a selected recording track of said record medium into register with said optical system, and focusing means operable upon the completion of the sector and track indexing operations for accurately locating said recording surface at the focal point of said optical system.

10. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, a base member a supporting unit mounted upon said base member, a rotatable shaft member, a pair of parallel arm members pivotally mounted upon said supporting unit and arranged to support said shaft member between their opposite extremities in such a manner that said shaft member may be rotated about its axis and displaced substantially radially about the pivotal mounting of said arm members, driving means for rotating said shaft member, a combination of spur gears rotatable with said shaft member and a pair of associated gear rack members for displacing said shaft member substantially radially, means for mounting said circular record medium upon the end of said shaft member which will position the recording surface area of said record medium in the light path of said optical system whereby any sector of said record medium may be brought into register with said optical system by revolving said record medium and any recording track of said record medium may be brought into register with said optical system by displacing said record medium substantially radially, electrical circuit means for selecting said sector and recording track to be brought into register with said optical system, coarse and fine sector indexing means responsive to said electrical circuit means for bringing a selected sector of said record medium into register with said optical system, coarse and fine track indexing means responsive to said electrical circuit means for bringing a selected recording track of said record medium into register with said optical system, and focusing means operable upon the completion of the sector and track indexing operations for accurately locating said recording surface at the focal point of said optical system.

11. The micro-image storage and retrieval unit defined in claim 10, wherein said focusing means includes a focus solenoid energizable by said electrical circuit means, a stationary lens member and a focus stop member including an aperture in register with said stationary lens member located at the focal point of said optical system on one side of said record medium, a barrel member located on the opposite side of said record medium, a cylinder member slidably supported by said barrel member, a movable lens member mounted within said cylinder member in register with said stationary lens member, and a mechanical linkage means for operating said slide member and movable lens member through the action of said focus solenoid whereby said movable lens member and record medium may be driven against said focus stop member located at the focal point of said optical system.

12. A micro-image storage and retrieval unit comprising a circular record medium having a recording surface area characterized by the ability to receive and retain a plurality of images in such a form that the retained images may be retrieved therefrom by projection techniques wherein the images are retained in a plurality of concentric recording tracks, each having the same number of images, extending circumferentially around said recording surface area with the corresponding images of each track being located within the same sector of the recording surface, an optical system, a base member, a supporting unit mounted upon said base member, a rotatable shaft member, a pair of parallel arm members pivotally mounted upon said supporting unit and arranged to support said shaft member between their opposite extremities in such a manner that said shaft member may be rotated about its axis and displaced substantially radially about the pivotal mounting of said parallel arm members, driving means for rotating said shaft member, a combination of spur gears rotatable with said shaft member and a pair of associated gear rack members for displacing said shaft member substantially radially, means for mounting said circular record medium upon the end of said shaft member which will position the recording surface area of said record medium in the light path of said optical system whereby any sector of said record medium may be brought into register with said optical system by revolving said record medium and any recording track of said record medium may be brought into register with said optical system by displacing said record medium substantially radially, electrical circuit means for selecting said sector and recording track to be brought into register with said optical system, sector indexing means responsive to said electrical circuit means for stopping the rotation of said record medium when the selected sector of said record medium is in register with said optical system, track indexing means responsive to said electrical circuit means for stopping the substantially radial motion of said record medium when the selected recording track of said record medium is in register with said optical system, and focusing means operable upon the completion of the sector and track indexing operations for accurately locating said recording surface at the focal point of said optical system.

13. The micro-image storage and retrieval unit defined in claim 12, wherein said track indexing means includes a coarse track selector rack member having a plurality of teeth, each of which corresponds to the same number of a plurality of recording tracks of said record medium for effectively dividing said record medium into a plurality of track areas, mounted upon and movable with one of said parallel arm members, a plurality of coarse track selector switching circuit means, each corresponding to a tooth of said coarse track selector member, and a plurality of fine track selector switching circuit means, each corresponding to a respective one of the recording tracks of said track areas as determined by said coarse track selector rack, for selecting the track of said record medium to be brought into register with said optical system, a coarse track selector solenoid energizable by said electrical circuit means, a plurality of commutating switching circuit means, a commutating switch operating linkage driven by one of said parallel arm members which successively operates each of said commutating switching circuit means for completing an electrical circuit to said coarse track selector solenoid through the operated one of said coarse track selector switching circuit means when the track area of said record medium which includes the selected track is in register with said optical system, a coarse track selector pawl member operated by said coarse track selector solenoid and arranged to engage a tooth of said coarse track selector rack member upon the energization of said coarse track selector solenoid, a fine track selector mechanism slide member attached to said coarse track selector pawl member and movable thereby upon the engagement of a tooth of said coarse track selector rack member by the coarse track selector pawl member, a fine track selector commutator member mounted adjacent to said fine track selector mechanism slide member, a fine track selector rack member mounted adjacent to said fine track selector mechanism slide member, a fine track selector solenoid mounted upon said fine track selector mechanism slide member, a fine track selector pawl member operated by said fine track selector solenoid mounted upon said fine track selector mechanism slide member and arranged to engage a tooth of said fine track selector rack member upon the energization of said fine track selector solenoid, and an electrical contact means mounted upon said fine track selector mechanism slide member and arranged to brush said fine track selector commutator member for completing an electrical circuit to said fine track selector solenoid through the operated one of said fine track selector switching circuit means when the selected recording track is in register with said optical system whereby the fine track selector pawl member is brought into engagement with a tooth of said fine track selector rack member for stopping the substantially radial displacement of said parallel arm members, rotatable shaft member, and record medium.

14. The track indexing means defined in claim 13, wherein said fine track selector mechanism includes a fine track selector rack member having an auxiliary stop notch movably mounted adjacent said fine track selector mechanism slide member and arranged to move therewith upon the engagement of said fine track selector pawl member with a tooth thereof, a stop member positioned in the path of travel of said fine track selector rack member for stopping the substantially radial displacement of said parallel arm members, rotatable shaft member, and record medium upon the engagement of said movably-mounted fine selector rack member therewith, an auxiliary stop solenoid energizable by said electrical circuit means mounted adjacent to said movably-mounted fine track selector rack member, and an auxiliary stop pawl member mounted adjacent to said movably-mounted fine track selector rack member and arranged to engage said auxiliary stop notch therein upon the energization of said auxiliary stop solenoid for stopping the substantially radial displacement of said parallel arm members, rotatable shaft member, and record medium before said movably-mounted fine selector rack member engages said stop member, by a distance equal to the width of one recording track whereby two different recording tracks may be selected by the same tooth of said fine selector rack member.

15. The fine track selector mechanism defined in claim 14 wherein said stop member is adjustable.

References Cited by the Examiner

UNITED STATES PATENTS

| | | | |
|---|---|---|---|
| 661,515 | 11/00 | Giel. | |
| 814,662 | 3/06 | Baker. | |
| 2,951,428 | 9/60 | Higonnet et al. | 95—4.5 |

NORTON ANSHER, *Primary Examiner.*

WILLIAM MISIEK, *Examiner.*